(12) United States Patent
Miyazaki

(10) Patent No.: US 8,628,450 B2
(45) Date of Patent: Jan. 14, 2014

(54) VEHICULAR POWER TRANSMISSION CONTROL APPARATUS

(75) Inventor: Takeshige Miyazaki, Chiryu (JP)

(73) Assignee: Aisin AI Co., Ltd., Nishio-Shi (JP)

( * ) Notice: Subject to any disclaimer, the term of this patent is extended or adjusted under 35 U.S.C. 154(b) by 365 days.

(21) Appl. No.: 13/080,907

(22) Filed: Apr. 6, 2011

(65) Prior Publication Data

US 2011/0251017 A1 Oct. 13, 2011

(30) Foreign Application Priority Data

Apr. 8, 2010 (JP) ................................ 2010-089105

(51) Int. Cl.
*B60W 10/02* (2006.01)
*B60W 10/08* (2006.01)

(52) U.S. Cl.
USPC ............................ 477/5; 477/180; 180/65.31

(58) Field of Classification Search
USPC ............. 180/65.275, 65.31; 477/5, 174, 180, 477/181, 904; 903/930
See application file for complete search history.

(56) References Cited

U.S. PATENT DOCUMENTS

| | | | |
|---|---|---|---|
| 5,839,533 A * | 11/1998 | Mikami et al. ................. | 180/165 |
| 6,126,251 A * | 10/2000 | Yoshii et al. .................. | 303/152 |
| 7,223,201 B2 * | 5/2007 | Colvin et al. .................... | 477/5 |
| 2003/0098185 A1 | 5/2003 | Komeda et al. | |
| 2006/0064225 A1 * | 3/2006 | Tabata et al. .................... | 701/96 |
| 2007/0102208 A1 * | 5/2007 | Okuda et al. ................ | 180/65.3 |

FOREIGN PATENT DOCUMENTS

| | | |
|---|---|---|
| DE | 198 02 480 A1 | 8/1999 |
| GB | 2 368 827 A | 5/2002 |
| JP | 2000-224710 | 8/2000 |
| JP | 2003-165361 A1 | 6/2003 |

* cited by examiner

*Primary Examiner* — Justin Holmes
*Assistant Examiner* — Huan Le
(74) *Attorney, Agent, or Firm* — Burr & Brown, PLLC

(57) ABSTRACT

When it is determined that a driver requests a deceleration of a vehicle (t1), a motor torque is kept to be zero. A value in the deceleration direction (deceleration torque stabilized value A) at which an engine torque is stabilized after it changes from a value in the acceleration direction to the value in the deceleration direction is predicted. Before the engine torque reaches the deceleration torque stabilized value A, the clutch torque is adjusted to be the deceleration torque stabilized value A. When the engine torque reaches the deceleration torque stabilized value A (t3), the clutch torque is gradually decreased from the deceleration torque stabilized value A, and a regeneration torque is gradually increased from zero. A decreasing slope of a vehicle torque is kept constant over a period (t1 to t3) when the vehicle torque decreases. Therefore, the vehicle can smoothly be decelerated during the deceleration of the vehicle. Thus, during the deceleration of a hybrid vehicle with clutch, the clutch torque and the regeneration torque are appropriately adjusted, whereby the vehicle can smoothly be decelerated.

4 Claims, 5 Drawing Sheets

VEHICULAR POWER TRANSMISSION CONTROL APPARATUS

FIELD OF THE INVENTION

The present invention relates to a vehicular power transmission control apparatus, especially to a vehicular power transmission control apparatus applied to a vehicle comprising an internal combustion engine and an electric motor as power sources, and a clutch.

BACKGROUND ART

In these days, a so-called hybrid vehicle comprising an engine and an electric motor (electric motor generator) as power sources has been developed (refer to, for example, Japanese Unexamined Patent Application Publication No. 2000-224710). In the hybrid vehicle, an output shaft of the electric motor is coupled to an input shaft or an output shaft of a transmission. In the hybrid vehicle, the electric motor is used as the power source generating a driving torque for driving the vehicle together with the engine or by itself, or is used as a power source for starting the engine. Further, the electric motor is used as an electric motor generator for generating a regeneration torque to provide a breaking force to the vehicle, or is used as an electric motor generator for generating an electric power which is supplied to and stored in a battery of the vehicle. These usages of the electric motor can improve a total energy efficiency (fuel consumption) of the vehicle as a whole.

SUMMARY OF THE INVENTION

A hybrid vehicle is considered below, the hybrid vehicle including a clutch, which is provided between an output shaft of an engine and an input shaft of a transmission, and which can adjust the maximum value of a torque that can be transmitted (hereinafter referred to as a "clutch torque"). This vehicle is referred to as "a hybrid vehicle with clutch" below.

In the hybrid vehicle with clutch, a torque of the engine passing through the clutch (engine-torque-after-clutch) and a torque of an electric motor are transmitted to driving wheels of the vehicle. The engine-torque-after-clutch can be adjusted by adjusting the clutch torque. The sum of the engine-torque-after-clutch and the torque of the electric motor is referred to as a "vehicle torque" below. Therefore, during the deceleration of the vehicle, the vehicle torque in the deceleration direction can be adjusted by adjusting the clutch torque (engine-torque-after-clutch in the deceleration direction) and the deceleration torque (regeneration torque) of the electric motor.

When it is determined that a driver requests the deceleration of the vehicle, such as when an acceleration pedal is changed from an on-state to an off-state (when an acceleration pedal opening degree is changed from zero to a value grater than zero), in the hybrid vehicle with clutch, the problem is how to adjust the clutch torque and the regeneration torque in order to smoothly decelerate the vehicle.

FIG. 5 illustrates one example of a manner of adjusting the clutch torque and the regeneration torque, when it is determined that the driver requests the deceleration of the vehicle based upon the change in the acceleration pedal opening degree from zero to a value greater than zero at a time t1. In FIG. 5, a torque in an acceleration direction of the vehicle is represented as "positive", while a torque in a deceleration direction of the vehicle is represented as "negative". Hereinafter, the state in which "a regeneration torque increases (decreases)" means that an absolute value of the regeneration torque increases (decreases), while the state in which "the torque in the deceleration direction increases (decreases) means that an absolute value of the torque in the deceleration direction increases (decreases).

In this example, the torque of the electric motor is kept to be zero before the time t1. Specifically, the vehicle is running by utilizing only the driving torque of the engine as the driving torque. The clutch torque is adjusted to have a value greater than the engine torque before the time t1 in order to prevent the clutch slipping.

When the acceleration pedal opening degree is changed from zero to a value greater than zero at the time t1 as in this example, the engine torque gradually decreases to assume the value (negative) in the deceleration direction from the value (positive) in the acceleration direction (see at a time t2) after the time t1, in general. Thereafter, the engine torque decreases to a certain value (hereinafter referred to as a "deceleration torque stabilized value") in the deceleration direction (see at a time t3), and then, is stabilized at the deceleration torque stabilized value (see after the time t3).

In this example, the clutch torque is adjusted to gradually decrease from the current value to zero after the time t2 when the engine torque changes from the value in the acceleration direction to the value in the deceleration direction. With this adjustment, the engine-torque-after-clutch in the deceleration direction increases from the time t2 to a time tA (the time when the engine torque in the deceleration direction exceeds the clutch torque), and then, decreases from the time tA to the time t3. On the other hand, the regeneration torque is adjusted to gradually increase after the time t2.

As a result, in this example, the vehicle torque decreases from the value in the acceleration direction toward the value in the deceleration direction during the period from the time t1 to the time tA, and after the time tA, the vehicle torque is stabilized at the deceleration torque stabilized value. However, during the period from the time t1 to the time tA, i.e., during the period in which the vehicle torque decreases, the decreasing slope of the vehicle torque from the time t1 to the time t2 is greater than the decreasing slope during the time t2 to the time tA. This is based upon the situation in which, from the time t1 to the time t2, the engine-torque-after-clutch decreases, but the regeneration torque is kept to be zero, while during the time t2 to the time tA, the engine-torque-after-clutch in the deceleration direction and the regeneration torque both increase.

From the above, when the decrease of the clutch torque and the increase of the regeneration torque from zero are started at the point when the engine torque is changed from the value in the acceleration direction to the value in the deceleration direction, the change in the decreasing slope inevitably occurs during the process of decreasing the vehicle torque. Therefore, there is room for improvement in the manner of adjusting the clutch torque and the regeneration torque for smoothly decelerating the vehicle.

An object of the present invention is to provide a vehicular power transmission control apparatus applied to a hybrid vehicle with clutch, wherein the vehicular power transmission control apparatus can appropriately adjust a clutch torque and a regeneration torque during a deceleration of the vehicle in order to smoothly decelerate the vehicle.

The vehicular power transmission control apparatus according to the present invention is applied to a vehicle including an internal combustion engine and an electric motor as power sources. The power transmission control apparatus includes a transmission mounted between an output shaft of the internal combustion engine and a driving wheel of the vehicle; and a clutch that is mounted between the output shaft of the internal combustion engine and an input shaft of the transmission, and that can adjust a clutch torque, which is the maximum torque that the clutch can transmit. An output shaft of the electric motor is connected to the input shaft or the output shaft of the transmission.

The power transmission control apparatus includes a control unit that controls the torque of the internal combustion engine and the torque of the electric motor, and controls the clutch torque to have a value greater than the torque of the output shaft of the internal combustion engine; and a determining unit that determines whether a driver requests the deceleration of the vehicle based upon a driver's operation for an acceleration operating member of the vehicle.

The feature of the power transmission control apparatus is as described below. Specifically, when it is determined that the driver requests the deceleration of the vehicle, the control unit keeps the torque of the electric motor to be zero, and predicts a deceleration torque stabilized value, which is the stabilized value, in the deceleration direction, of the torque of the internal combustion engine after it is changed from a value in the acceleration direction to a value in the deceleration direction. Before the torque of the internal combustion engine reaches the deceleration torque stabilized value, the control unit adjusts the clutch torque to be a value based upon the deceleration torque stabilized value, and when the torque of the internal combustion engine reaches the deceleration torque stabilized value, the control unit gradually decreases the clutch torque from the value based upon the deceleration torque stabilized value, as well as gradually increases a regeneration torque of the electric motor from zero.

Here, the clutch torque can be adjusted to be the value based upon the deceleration torque stabilized value, after the torque of the internal combustion engine changes from the value in the acceleration direction to the value in the deceleration direction, and before the torque of the internal combustion engine reaches the deceleration torque stabilized value. It is preferable that a value equal to the deceleration torque stabilized value is used as the value based upon the deceleration torque stabilized value.

According to the configuration described above, when the torque of the internal combustion engine reaches the deceleration torque stabilized value, the decrease of the clutch torque and the increase of the regeneration torque from zero are started. Thus, the vehicle torque decreases from the value in the acceleration direction to the value in the deceleration direction at the point after it is determined that the driver requests the deceleration of the vehicle and before the torque of the internal combustion engine reaches the deceleration torque stabilized value. After this point, the vehicle torque can be stabilized at a certain value in the deceleration direction.

The torque of the internal combustion engine passing through the clutch decreases during the period when the vehicle torque decreases, while the regeneration torque is kept to be zero. Therefore, the decreasing slope of the vehicle torque can be kept constant over the period when the vehicle torque decreases. Accordingly, the vehicle can smoothly be decelerated during the deceleration of the vehicle.

DESCRIPTION OF THE PREFERRED EMBODIMENT

Next will be described an embodiment of a vehicular power transmission control apparatus according to the present invention with reference to the drawings.

(Configuration)

Figure 1:
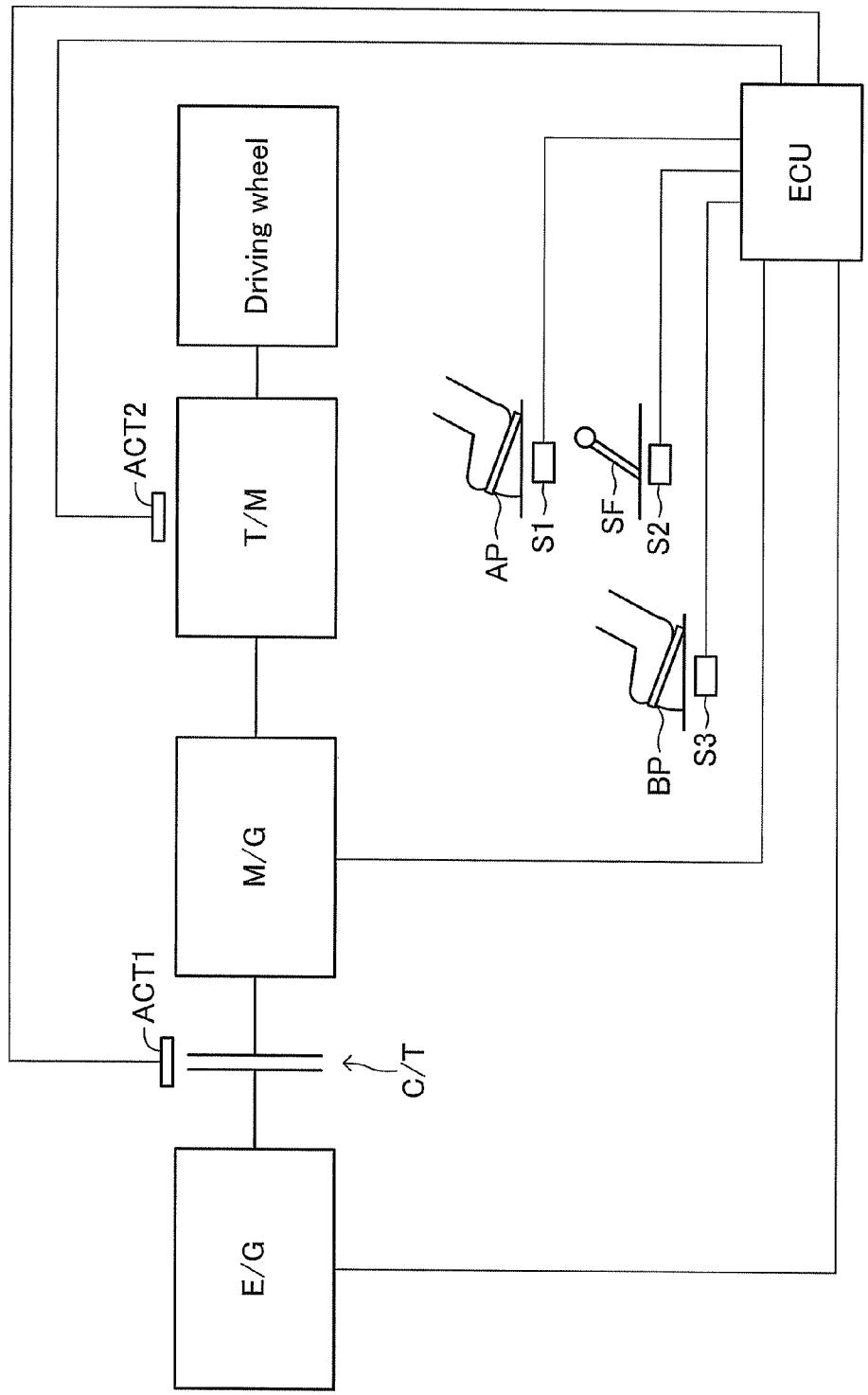
FIG. 1 is a schematic structural diagram illustrating a vehicle having mounted thereto a vehicular power transmission control apparatus according to an embodiment of the present invention.

FIG. 1 shows a schematic configuration of a vehicle having mounted thereto a vehicular power transmission control apparatus (hereinafter, referred to as a "present apparatus") according to an embodiment of the present invention. The present apparatus is applied to the vehicle comprising, as its power sources, an internal combustion engine and a motor generator. The vehicle comprises a so-called automated manual transmission, which uses a multiple gear ratio transmission and a clutch, but which does not have a torque converter.

The vehicle comprises the engine (E/G), the transmission (T/M), a clutch (C/T), and the motor generator (M/G). The E/G is one of well-known internal combustion engines, including a gasoline engine which uses a gasoline as a fuel and a diesel engine which uses a light diesel oil as a fuel. An output shaft of the E/G is connected to an input shaft of the T/M through the C/T.

The T/M is one of well-known multiple gear ratio transmissions. The T/M has a plurality of gear positions (e.g., five gear positions) as forward gear positions, one gear position as a reverse gear position, and a neutral gear position. The T/M does not comprise a torque converter. The T/M changes the gear position only by controlling a T/M actuator ACT2.

The C/T comprises one of well-known structures and is configured so as to be capable of adjusting the maximum value (clutch torque) of the torque that can be transmitted between the output shaft of the E/G and the input shaft of the T/M. The clutch torque is controlled through the adjustment of a clutch stroke by a clutch actuator ACT1.

The M/G comprises one of well-known structures (e.g., an AC synchronous motor), and is configured in such a manner that a rotor (not shown) rotates integrally with an output shaft of the M/G. The output shaft of the M/G is connected to the input shaft of the T/M through a predetermined gear train. The M/G functions as the power source as well as the electric power generator.

The present apparatus further comprises an acceleration pedal opening degree sensor S1 which detects an operation amount (acceleration pedal opening degree) of an acceleration pedal AP, a shift position sensor S2 which detects a position of a shift lever SF, and a brake sensor S3 which detects whether a brake pedal BP is operated or not.

The present apparatus further comprises an electronic control unit ECU. The ECU controls the actuators ACT1 and ACT2, based on information and so on from the sensors S1-S3 and the other sensors, to thereby control the clutch torque of the UT, and the gear position of the T/M. Further, the ECU controls the torque of the output shaft of each of the E/G, and M/G.

The gear position of the T/M is controlled based on "a required driving torque calculated based upon a vehicle speed obtained from an unillustrated wheel speed sensor, and upon the operation amount (acceleration pedal opening degree) of the acceleration pedal AP obtained from the acceleration pedal opening degree sensor S1", and a position of the shift lever SF obtained from the shift position sensor S2. When the position of the shift lever SF is at a position corresponding to a "manual mode", the gear position of the T/M is basically set at a gear position selected by the shift lever SF operated by the driver. On the other hand, when the position of the shift lever SF is at a position corresponding to an "automatic mode", the gear position of the T/M is automatically controlled based on "a combination of the vehicle speed and the required driving torque", even when the shift lever SF is not operated.

The clutch torque of the C/T is generally adjusted to be greater than the torque of the output shaft of the E/G when the vehicle is driving. This adjustment can prevent a clutch slipping when the vehicle is driving.

For convenience of description, the torque of the output shaft of the E/G is referred to as "engine torque", the torque of the output shaft of the M/G is referred to as "motor torque", the engine torque after passing through the C/T is referred to as "engine-torque-after-clutch", and the sum of the engine-torque-after-clutch and the motor torque is referred to as "vehicle torque". In particular, the motor torque in the deceleration direction is referred to as "regeneration torque". The engine torque and the regeneration torque can be acquired based upon the detection results of the corresponding torque sensor in the deceleration direction.

(Adjustment of Clutch Torque and Regeneration Torque During Deceleration of Vehicle)

In the hybrid vehicle with clutch, the engine-torque-after-clutch and the motor torque are transmitted to the driving wheels of the vehicle. The engine-torque-after-clutch can be adjusted by adjusting the clutch torque. Therefore, during the deceleration of the vehicle, the vehicle torque in the deceleration direction can be adjusted by adjusting the clutch torque (accordingly, the engine-torque-after-clutch in the deceleration direction), and the motor torque in the deceleration direction (accordingly, the regeneration torque).

In the hybrid vehicle with clutch, when it is determined that the driver requests the deceleration of the vehicle (when the acceleration pedal opening degree is changed from zero to a value greater than zero), such as when an acceleration pedal AP is changed from its ON-state to its OFF-state, it is necessary to appropriately adjust the clutch torque and the regeneration torque in order to smoothly decelerate the vehicle. The determination that "the driver requests the deceleration of the vehicle" may be made based upon the state in which the acceleration pedal opening degree is changed from a value, which is greater than a very small value greater than zero, to a value less than the very small value, or based upon the state in which the vehicle actually starts the deceleration on a climbing road regardless of the acceleration pedal opening degree.

Figure 2:
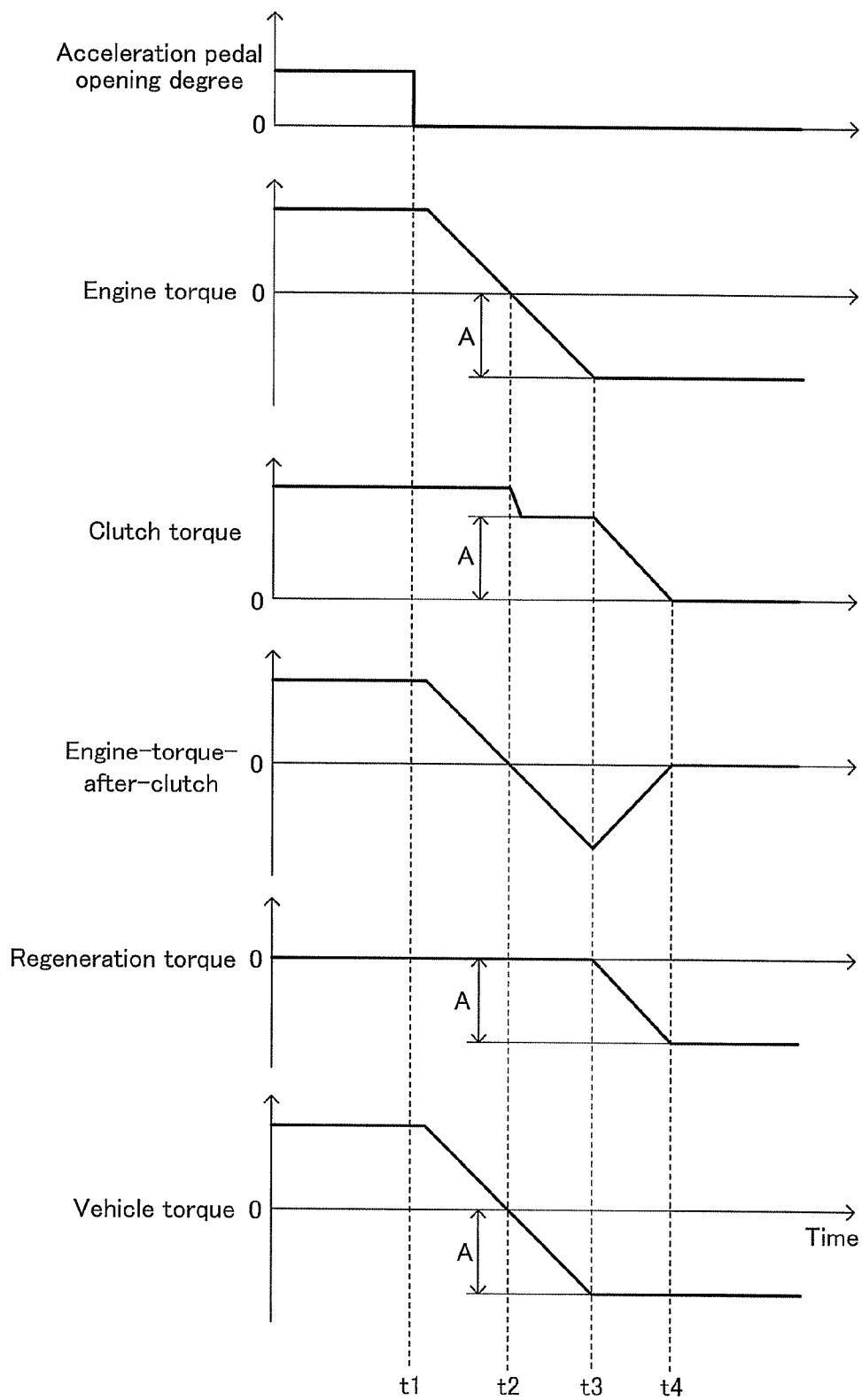
FIG. 2 is a time chart illustrating one example of a change pattern of a clutch torque and a regeneration torque during a deceleration of a vehicle, those torques being adjusted by the apparatus illustrated in FIG. 1.

In the present apparatus, the clutch torque and the regeneration torque are adjusted as illustrated in FIG. 2. FIG. 2 illustrates one example of a manner of adjusting the clutch torque and the regeneration torque, in case where it is determined that the driver requests the deceleration of the vehicle based upon the state in which the acceleration pedal opening degree is changed from a value greater than zero to zero. In FIG. 2, the torque in the acceleration direction of the vehicle is represented as "positive", while the torque in the deceleration direction of the vehicle is represented as "negative". Hereinafter, the state in which "the regeneration torque increases (decreases)" means that the absolute value of the regeneration torque increases (decreases), while the state in which "the torque in the deceleration direction increases (decreases)" means that "the absolute value of the torque in the deceleration direction increases (decreases).

In the example illustrated in FIG. 2, the motor torque is kept to be zero before a time t1. Specifically, the vehicle is driving by utilizing only the engine torque as the driving torque. Before the time t1, the clutch torque is adjusted to have a value greater than the engine torque in order to prevent the clutch slipping.

When the acceleration pedal opening degree is changed from the value greater than zero to zero at the time t1, the fuel injection to the E/G is stopped, whereby the engine torque gradually decreases to be zero after the time t1 (changes from the value in the acceleration direction (positive) to the value in the deceleration direction (negative)) (see at a time t2). Thereafter, the engine torque decreases to a certain value in the deceleration direction (hereinafter referred to as "deceleration torque stabilized value A") (see at a time t3), and then, the engine torque is stabilized at the deceleration torque stabilized value A in the deceleration direction (see after the time t3). The deceleration torque stabilized value A corresponds to a so-called "engine brake".

In the present apparatus, the deceleration stabilized value A is estimated after the time t1 and before the time t2 when the engine torque reaches zero. This estimation can be attained based upon the current revolution of the E/G and "the characteristic of the engine torque in the deceleration direction (the torque based upon the so-called engine brake) with respect to the revolution of the E/G", which can be acquired beforehand.

In the present apparatus, the clutch torque is adjusted to be the value equal to the deceleration torque stabilized value A after the time t2 when the engine torque reaches zero and before the time t3 when the engine torque reaches the deceleration torque stabilized value A in the deceleration direction. The clutch torque may be adjusted to be a value slightly greater than the deceleration torque stabilized value A.

In the present apparatus, the clutch torque gradually decreases from the deceleration torque stabilized value A, and the regeneration torque gradually increases from zero, from the time t3 when the engine torque reaches the deceleration torque stabilized value A in the deceleration direction.

As described above, according to the present apparatus, the decrease of the clutch torque and the increase of the regeneration torque from zero are started, when the engine torque reaches the deceleration torque stabilized value A in the deceleration direction (at the time t3). Thus, the vehicle torque decreases from the value in the acceleration direction (positive) to the value in the deceleration direction (negative), during the period from the time t1 when it is determined that the driver requests the deceleration of the vehicle to the time t3 when the engine torque reaches the deceleration torque stabilized value A in the deceleration direction. After the time t3, the vehicle torque can be stabilized at the deceleration torque stabilized value A in the deceleration direction.

The engine-torque-after-clutch decreases, but the regeneration torque is kept to be zero, over the period from the time t1 to the time t3 when the vehicle torque decreases. Therefore, the decreasing slope of the vehicle torque can be kept constant over the period (t1 to t3) when the vehicle torque decreases. Accordingly, the vehicle can smoothly be decelerated during the deceleration of the vehicle.

Figure 3:
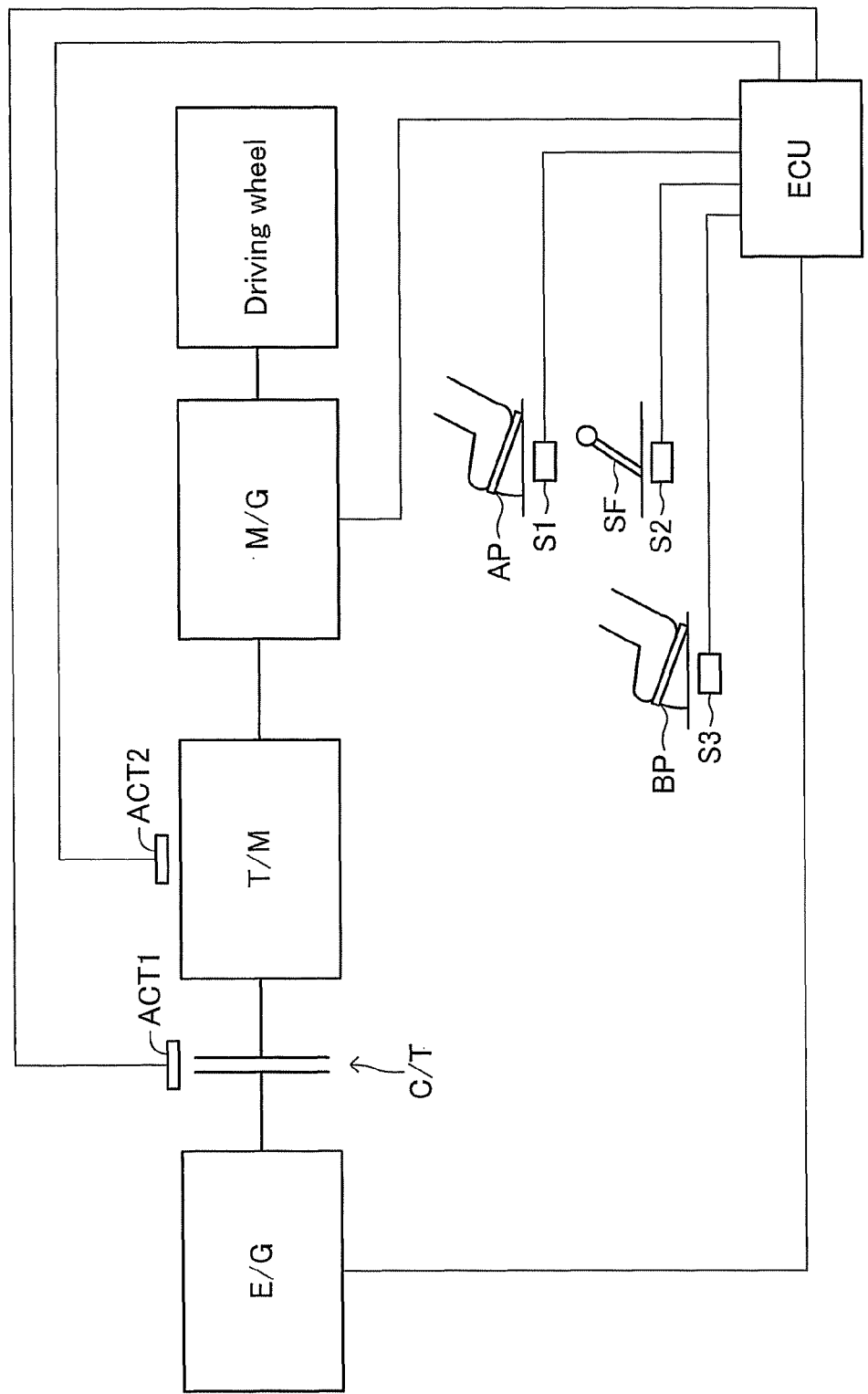
FIG. 3 is a diagram, corresponding to FIG. 1, for a vehicular power transmission control apparatus according to a modification of the embodiment of the present invention.

The present invention is not limited to the above-mentioned embodiment, and various modifications are possible without departing from the scope of the present invention. For example, in the above-mentioned embodiment, the output shaft of the M/G is connected to the input shaft of the T/M via the predetermined gear train (see FIG. 1). On the other hand, as illustrated in FIG. 3, the output shaft of the M/G may be connected to the output shaft of the T/M via a predetermined gear train. Alternatively, as illustrated in FIG. 4, a changeover mechanism may be employed, which mechanism selectively realizes either one of "IN-connection state" for connecting the output shaft of the M/G and the input shaft of the T/M and "OUT-connection state" for connecting the output shaft of the M/G and the output shaft of the T/M, according to the state of the vehicle.

Figure 4:
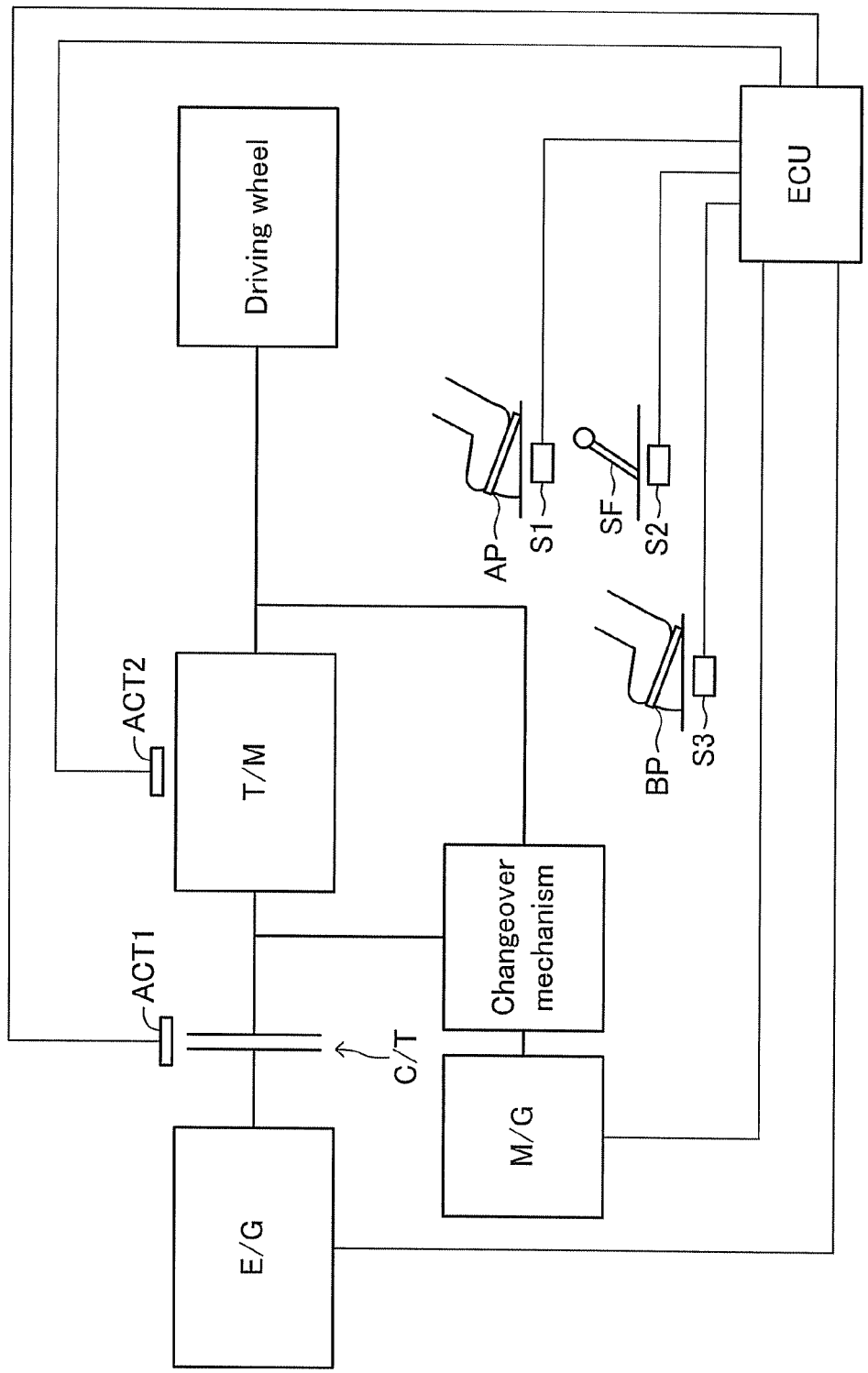
FIG. 4 is a diagram, corresponding to FIG. 1, for a vehicular power transmission control apparatus according to another modification of the embodiment of the present invention.
Figure 5:
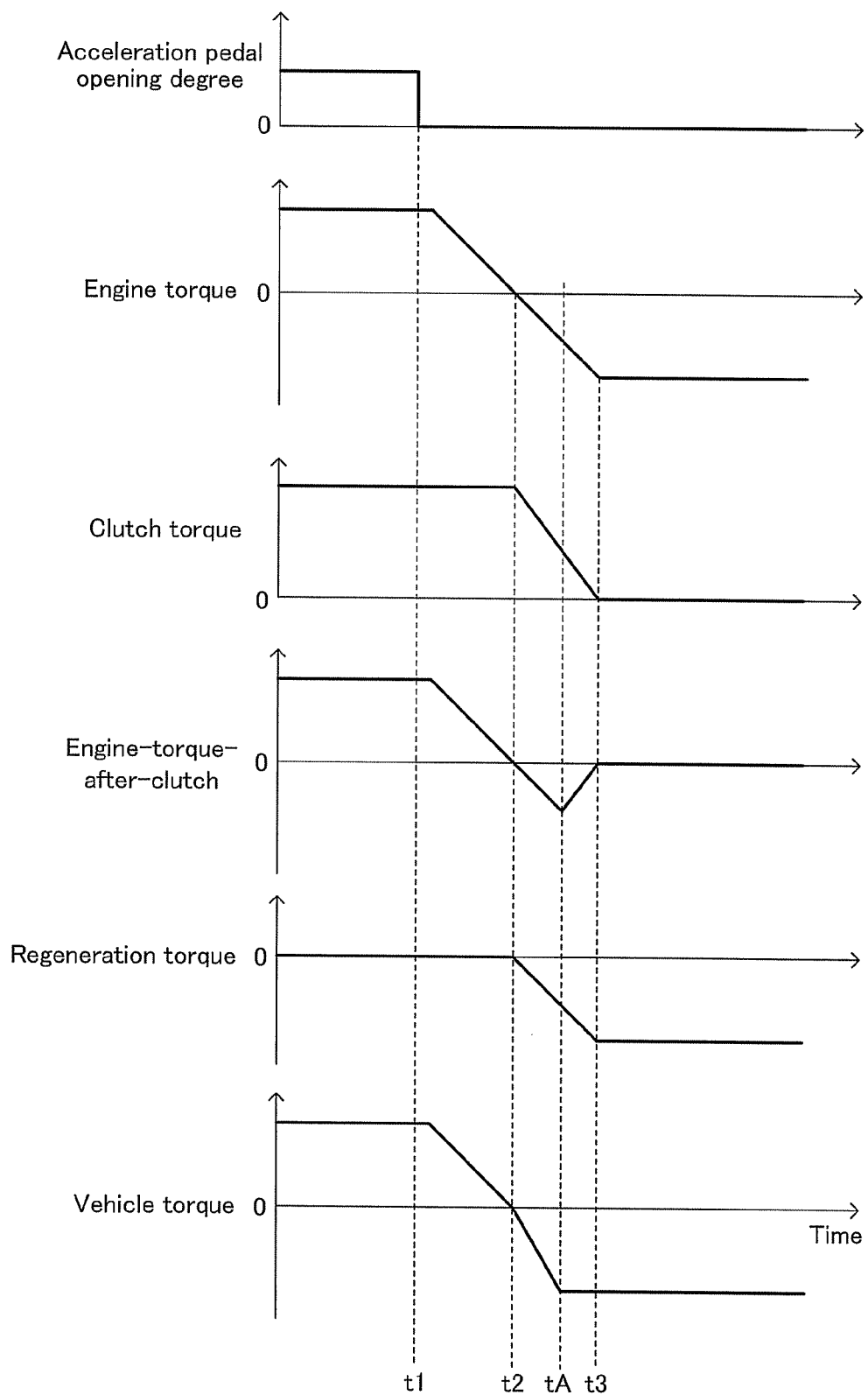
FIG. 5 is a time chart illustrating one example of a change pattern of a clutch torque and a regeneration torque during a deceleration of a vehicle, those torques being adjusted by a conventional apparatus.

In the case of FIG. 3, and when the "OUT-connection state" illustrated in FIG. 4 is selected, in particular, a value obtained by converting the torque into the torque of the output shaft of the transmission, i.e., the value obtained by multiplying the speed reducing ratio of the transmission M/T, has to be used as the "engine torque" and the "engine-torque-after-clutch" illustrated in FIG. 2.

In the above-mentioned embodiment, the decrease of the clutch torque and the increase of the regeneration torque from zero are simultaneously started (see at the time t3 in FIG. 2). However, the increase of the regeneration torque from zero may be started slightly earlier than the decrease of the clutch torque. With this, the situation in which a valley of the vehicle torque in the deceleration direction is produced can be avoided as much as possible, in case where the decrease of the clutch torque is started earlier than the expected point for any reason.

In the above-mentioned embodiment, the E/G may be stopped at the point when the clutch torque reaches zero, or immediately after this point. In the above-mentioned embodiment, a single clutch is used as the clutch. However, a so-called double clutch may be used. In the above-mentioned embodiment, the T/M is used in which the gear position is changed by the transmission actuator ACT2. However, a T/M (a so-called manual transmission) in which the gear position is changed by the driver's operation for the shift lever may be used.

What is claimed is:

1. A vehicular power transmission control apparatus that is applied to a vehicle including an internal combustion engine and an electric motor as power sources, and that includes:
   a transmission mounted between an output shaft of the internal combustion engine and a driving wheel of the vehicle; and
   a clutch that is mounted between the output shaft of the internal combustion engine and an input shaft of the transmission, and that can adjust a clutch torque, which is a maximum torque that the clutch can transmit, wherein
   an output shaft of the electric motor is connected to the input shaft or the output shaft of the transmission,
   the power transmission control apparatus comprising:
   a control unit that controls a torque of the internal combustion engine and a torque of the electric motor based upon a driving condition of the vehicle, and controls the clutch torque to have a value greater than the torque of the output shaft of the internal combustion engine; and
   a determining unit that determines whether a driver requests a deceleration of the vehicle based upon a driver's operation for an acceleration operation member of the vehicle, wherein
   the control unit is configured such that,
   when it is determined that the driver requests the deceleration of the vehicle,
   it keeps the torque of the electric motor to be zero,
   estimates a deceleration torque stabilized value, which is the stabilized value, in the deceleration direction, of the torque of the internal combustion engine after it is changed from a value in the acceleration direction to a value in the deceleration direction,
   adjusts the clutch torque to be a value based upon the deceleration torque stabilized value, before the torque of the internal combustion engine reaches the deceleration torque stabilized value, and
   when the torque of the internal combustion engine reaches the deceleration torque stabilized value, it gradually decreases the clutch torque from the value based upon the deceleration torque stabilized value, as well as gradually increases a regeneration torque of the electric motor from zero.

2. A vehicular power transmission control apparatus according to claim 1, wherein
   the control unit is configured to adjust the clutch torque to have the value based upon the deceleration torque stabilized value, after the torque of the internal combustion engine changes from a value in the acceleration direction to a value in the deceleration direction, and before the torque of the internal combustion engine reaches the deceleration torque stabilized value.

3. A vehicular power transmission control apparatus according to claim 1, wherein
   the control unit is configured to use a value equal to the deceleration torque stabilized value as the value based upon the deceleration torque stabilized value.

4. A vehicular power transmission control apparatus according to claim 2, wherein
   the control unit is configured to use a value equal to the deceleration torque stabilized value as the value based upon the deceleration torque stabilized value.

* * * * *